(12) United States Patent
Tsuchiyama

(10) Patent No.: US 6,704,398 B2
(45) Date of Patent: Mar. 9, 2004

(54) HANDY COMMUNICATION TERMINAL

(75) Inventor: Kinya Tsuchiyama, Tokyo (JP)

(73) Assignee: NEC Corporation, Tokyo (JP)

(*) Notice: Subject to any disclaimer, the term of this patent is extended or adjusted under 35 U.S.C. 154(b) by 197 days.

(21) Appl. No.: 09/975,022

(22) Filed: Oct. 12, 2001

(65) Prior Publication Data

US 2002/0045464 A1 Apr. 18, 2002

(30) Foreign Application Priority Data

Oct. 13, 2000 (JP) .................................. 2000-313908

(51) Int. Cl.$^7$ ................................................ H04M 11/00
(52) U.S. Cl. ........................ 379/93.23; 379/355.09; 455/564
(58) Field of Search .................. 379/93.23, 93.17, 379/354–355.02, 355.09; 455/564, 566, 403

(56) References Cited

U.S. PATENT DOCUMENTS

| | | | | |
|---|---|---|---|---|
| 5,638,438 A | * | 6/1997 | Keen | 379/354 |
| 6,125,287 A | * | 9/2000 | Cushman et al. | 455/566 |
| 6,137,420 A | | 10/2000 | Kobayashi | 340/825.44 |
| 6,223,057 B1 | * | 4/2001 | Sone | 455/564 |
| 6,256,382 B1 | * | 7/2001 | Toda | 379/355.01 |
| 6,430,405 B1 | * | 8/2002 | Jambhekar et al. | 455/403 |

FOREIGN PATENT DOCUMENTS

| | | | | |
|---|---|---|---|---|
| CN | 1274203 | | 11/2000 | |
| JP | 10-294782 | | 11/1998 | |
| JP | 10-304452 | | 11/1998 | |
| JP | 10304452 A | * | 11/1998 | ........... H04Q/7/38 |
| JP | 10-327444 | | 12/1998 | |
| JP | 11-55389 | | 2/1999 | |
| JP | 11055389 A | * | 2/1999 | ........... H04M/1/274 |
| JP | 2919395 | | 4/1999 | |
| JP | 11-110407 | | 4/1999 | |
| JP | 2000-81937 | | 3/2000 | |
| JP | 2000-134311 | | 5/2000 | |
| JP | 2000165501 A | * | 6/2000 | ........... H04M/1/27 |

* cited by examiner

Primary Examiner—Wing Chan
(74) Attorney, Agent, or Firm—Foley & Lardner

(57) ABSTRACT

A communication terminal includes (a) a memory which stores telephone directory data input into the handy communication terminal, (b) a display unit which displays the telephone directory data, and (c) a controller which displays modes each of which determines a specific order of displaying the telephone directory data in the display unit, and displays the telephone directory data in the display unit in accordance with a mode selected by a user.

11 Claims, 10 Drawing Sheets

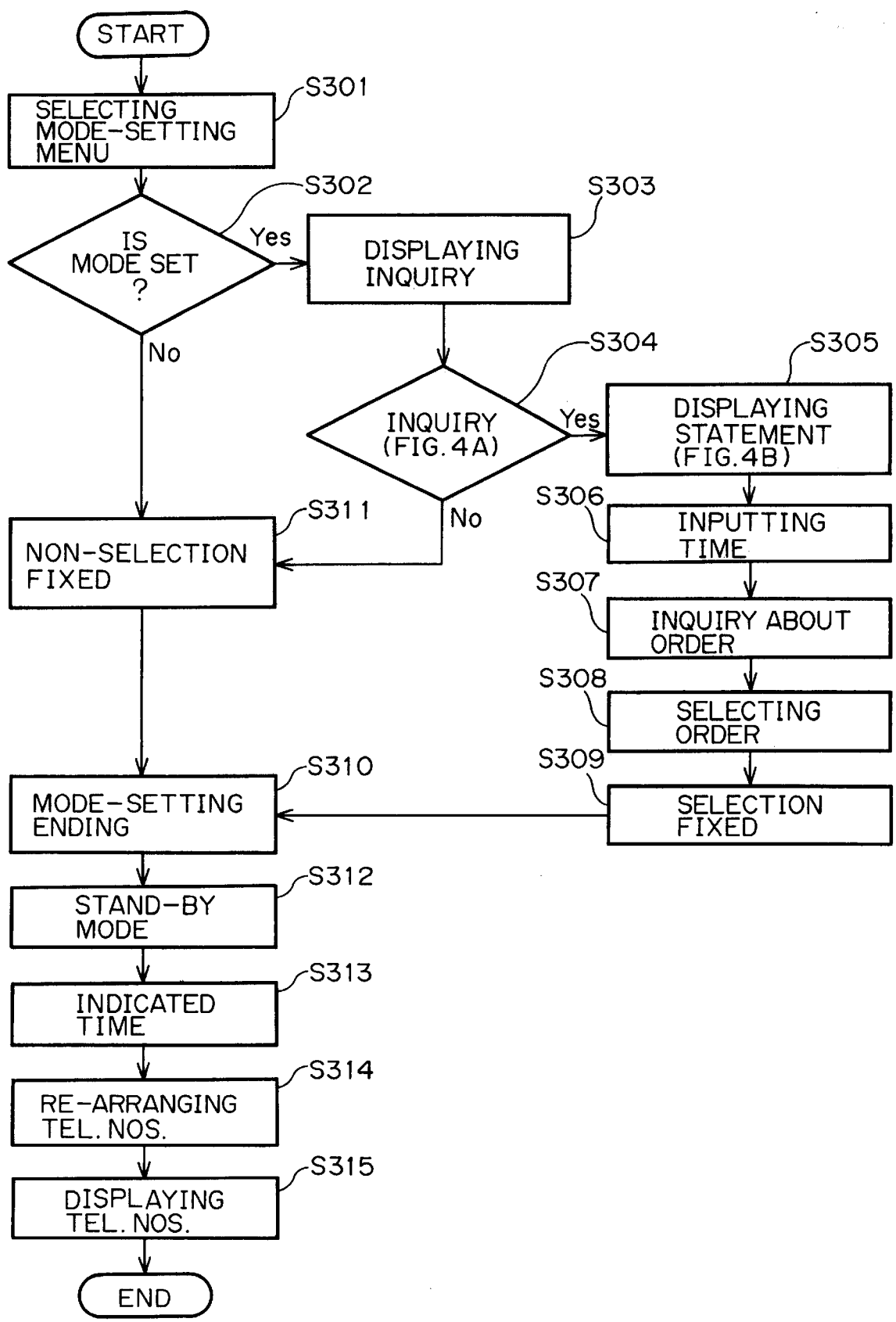

FIG.4A

DO YOU SET A MODE IN ACCORDANCE WITH
A TIME ?

YES                    NO

FIG.4B

PLEASE INDICATE A TIME AT WHICH THE
MODE STARTS AND ENDS.

START : ☐☐ : ☐☐
        (HOUR) (MINUTES)
END   : ☐☐ : ☐☐
        (HOUR) (MINUTES)

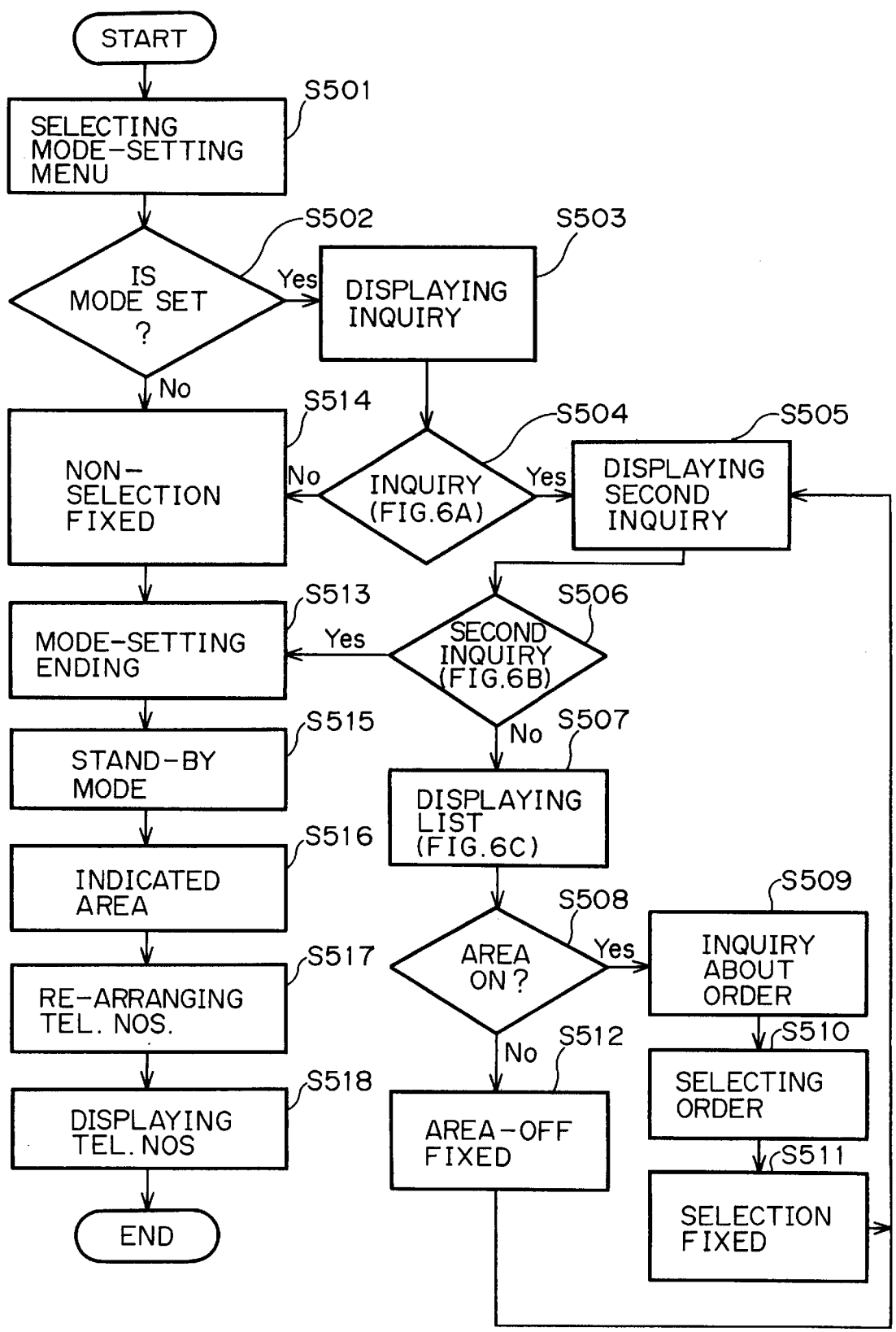

FIG.6A

```
DO YOU SET A MODE IN ACCORDANCE WITH
AN AREA WHERE YOU ARE ?

YES              NO
```

FIG.6B

```
DO YOU FINISH SELECTION OF AREA ?

YES              NO
```

FIG.6C

```
FIRST AREA   : ON / OFF
SECOND AREA : ON / OFF
THIRD AREA   : ON / OFF
```

FIG.8A

DO YOU SET A MODE IN ACCORDANCE WITH
A DAY OF THE WEEK ?

YES                          NO

FIG.8B

DO YOU FINISH SELECTION OF A DAY
OF THE WEEK ?

YES                          NO

FIG.8C

| MONDAY    : ON/OFF | TUESDAY  : ON/OFF |
| WEDNESDAY : ON/OFF | THURSDAY : ON/OFF |
| FRIDAY    : ON/OFF | SATURDAY : ON/OFF |
| SUNDAY    : ON/OFF |                   |

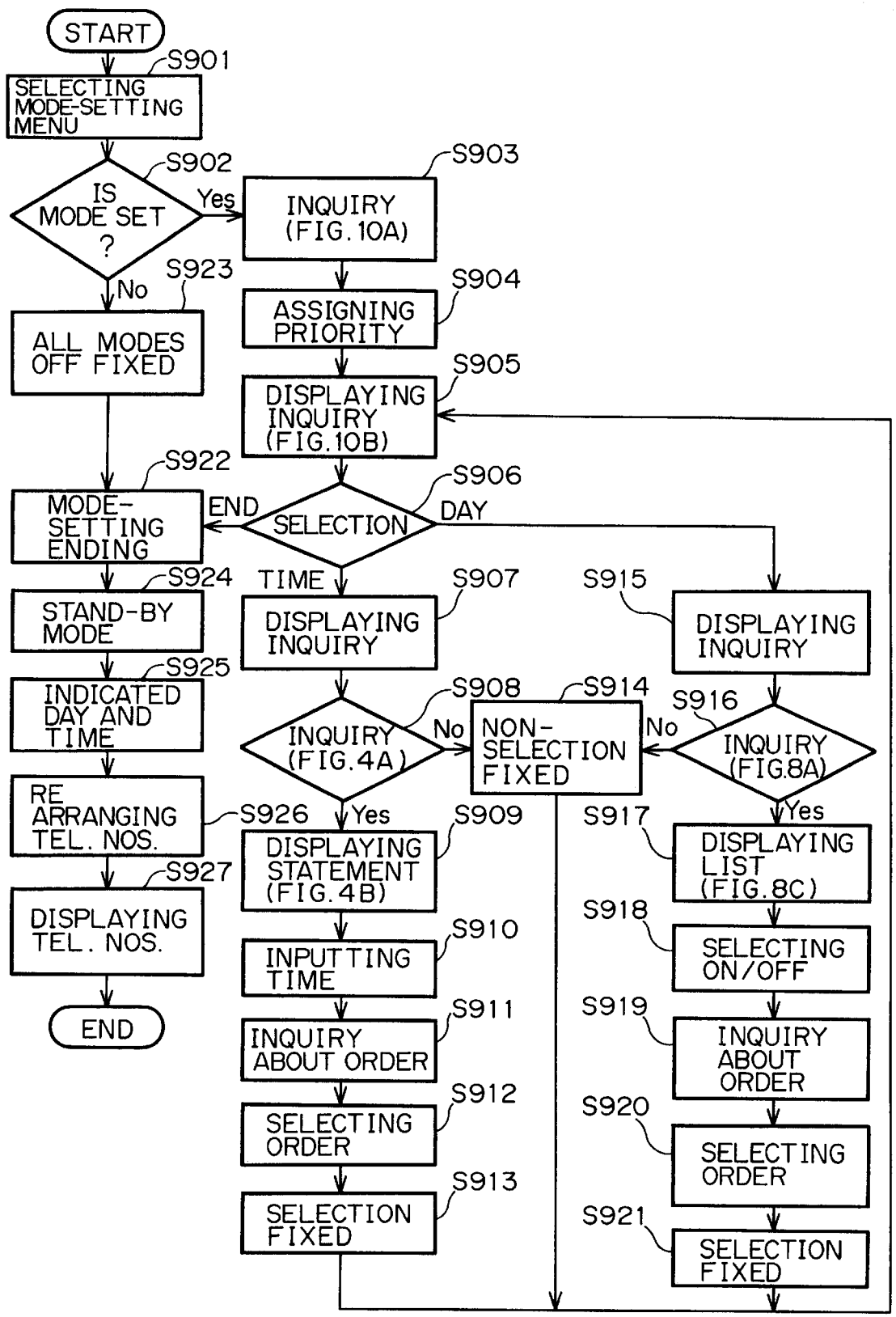

FIG.10A

```
ASSIGN PRIORITY TO THE FOLLOWING MODES
           • TIME : { 1 }
           • DAY  : { 2 }
               OK ?
```

FIG.10B

```
            SELECT A MODE

• TIME
         • DAY
         • TERMINATION OF MODE-SETTING
```

HANDY COMMUNICATION TERMINAL

BACKGROUND OF THE INVENTION

1. Field of the Invention

The invention relates to a handy communication terminal in which a user can select an order of displaying telephone numbers stored in a memory equipped with the handy communication terminal.

2. Description of the Related Art

In a conventional handy communication terminal, telephone numbers are displayed in various orders. For instance, telephone numbers are displayed in a display unit of a handy communication terminal in an alphabetical order, an order of being stored in a memory, in groups, in an order of dialing, or in an order of frequencies of making a call or receiving a call.

For instance, Japanese Unexamined Patent Publication 11-110407 has suggested a mobile communication terminal in which telephone numbers are displayed in a display screen in an order of being stored into a telephone directory registration table.

Japanese Patent No. 2919395 (Japanese Unexamined Patent Publication No. 10-145828) has suggested a radio-signal selective-calling system which puts a calling number at the head of signals to be transmitted, when data to be transmitted is made first, and then, a calling number is selected.

Japanese Unexamined Patent Publication No. 10-327444 has suggested a radio-signal communication device which receives data from a base station, and outputs the received data when a certain key is actuated.

Japanese Unexamined Patent Publication No. 2000-134311 has suggested a method of making a telephone directory in a cellular phone, including the steps of making telephone directory data by means of a personal computer, and transmitting the telephone directory data to a cellular phone through e-mail such that the cellular phone can use the telephone directory data without any changes.

In the above-mentioned conventional devices and methods, an order of displaying telephone numbers stored in a memory equipped with a communication device is kept fixed. For instance, telephone numbers are displayed in an order being stored into the communication device.

However, a user often makes a call to different persons in accordance with an area in which the user presently visits, a day of the week, or a time. Hence, if an order of displaying telephone numbers is kept fixed, it is quite inconvenient for a user when he/she makes a call.

SUMMARY OF THE INVENTION

In view of the above-mentioned problems in the conventional communication devices, it is an object of the present invention to provide a communication device in which a user can change an order of displaying telephone numbers, and display telephone numbers in a display screen in accordance with a mode the user selected.

It is also an object of the present invention to provide a method of displaying telephone numbers in a communication terminal which method allows a user to do the same.

In one aspect of the present invention, there is provided a communication terminal including (a) a memory which stores telephone numbers input into the handy communication terminal, (b) a display unit which displays the telephone the, and (c) a controller which displays modes each of which determines a specific order of displaying the telephone the in the display unit, and displays the telephone the in the display unit in accordance with a mode selected by a user.

It is preferable that the controller assigns a priority to each of the modes, and displays the telephone numbers in accordance with a mode having a higher priority than others.

For instance, the modes include a mode by which a specific order of displaying the telephone numbers is determined in accordance with a time, a mode by which a specific order of displaying the telephone numbers is determined in accordance with a day of the week, and a mode by which a specific order of displaying the telephone numbers is determined in accordance with an area in which the communication terminal is used.

In another aspect of the present invention, there is provided a method of displaying telephone numbers in a communication terminal, including the steps of (a) stores telephone numbers in the handy communication terminal, (b) selecting a mode in accordance with which an order of displaying the telephone numbers is determined, and (c) displaying the telephone numbers in the order in a display unit of the communication terminal.

The method may further include the step of determining an order of displaying the telephone numbers in each of the modes.

The method may further include the step of assigning a priority to each of the modes such that the telephone numbers is displayed in accordance with a mode having a higher priority than others.

It is preferable that the step (b) includes the steps of (b1) displaying a mode-selection inquiry for asking a user which mode the user selects, (b2) inputting a time at which a first mode starts and ends, if the user selects the first mode in the step (b1), and (b3) selecting an order of displaying the telephone numbers while the first mode is in operation.

It is preferable that the step (b) includes the steps of (b1) displaying a mode-selection inquiry for asking a user which mode the user selects, (b2) selecting an area in which the telephone numbers is arranged in accordance with a specific order, if the user selects a second mode in the step (b1), and (b3) selecting an order of displaying the telephone numbers while the second mode is in operation.

It is preferable that the step (b) includes the steps of (b1) displaying a mode-selection inquiry for asking a user which mode the user selects, (b2) selecting a day of the week in which the telephone numbers is arranged in accordance with a specific order, if the user selects a third mode in the step (b1), and (b3) selecting an order of displaying the telephone numbers while the third mode is in operation.

It is preferable that the step (b) includes the steps of (b1) displaying a mode-selection inquiry for asking a user which mode the user selects, (b2) assigning a priority to each of modes, and (b3) selecting an order of displaying the telephone numbers while each of the modes is in operation.

The advantages obtained by the aforementioned present invention will be described hereinbelow.

In accordance with the present invention, a user can select a mode in accordance with which an order of displaying telephone numbers in a display screen is determined. Hence, a user can readily select a target telephone number when a telephone directory is used. Thus, the present invention enhances serviceability of the communication terminal.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 3 is a flow chart showing steps to be carried out in the first mode in which an order of displaying telephone numbers is determined in accordance with a time selected by a user.

FIGS. 4A and 4B illustrate examples of images to be displayed in a display screen of the handy communication terminal in the first mode.

FIG. 5 is a flow chart showing steps to be carried out in the second mode in which an order of displaying telephone numbers is determined in accordance with an area in which a user is.

FIGS. 6A, 6B and 6C illustrate examples of images to be displayed in a display screen of the handy communication terminal in the second mode.

FIGS. 8A, 8B and 8C illustrate examples of images to be displayed in a display screen of the handy communication terminal in the third mode.

FIG. 9 is a flow chart showing steps for assigning a priority to each of the modes.

FIGS. 10A and 10B illustrate examples of images to be displayed in a display screen of the handy communication terminal when a priority is assigned to each of the modes.

DESCRIPTION OF THE PREFERRED EMBODIMENTS

Preferred embodiments in accordance with the present invention will be explained hereinbelow with reference to drawings.

Figure 1:
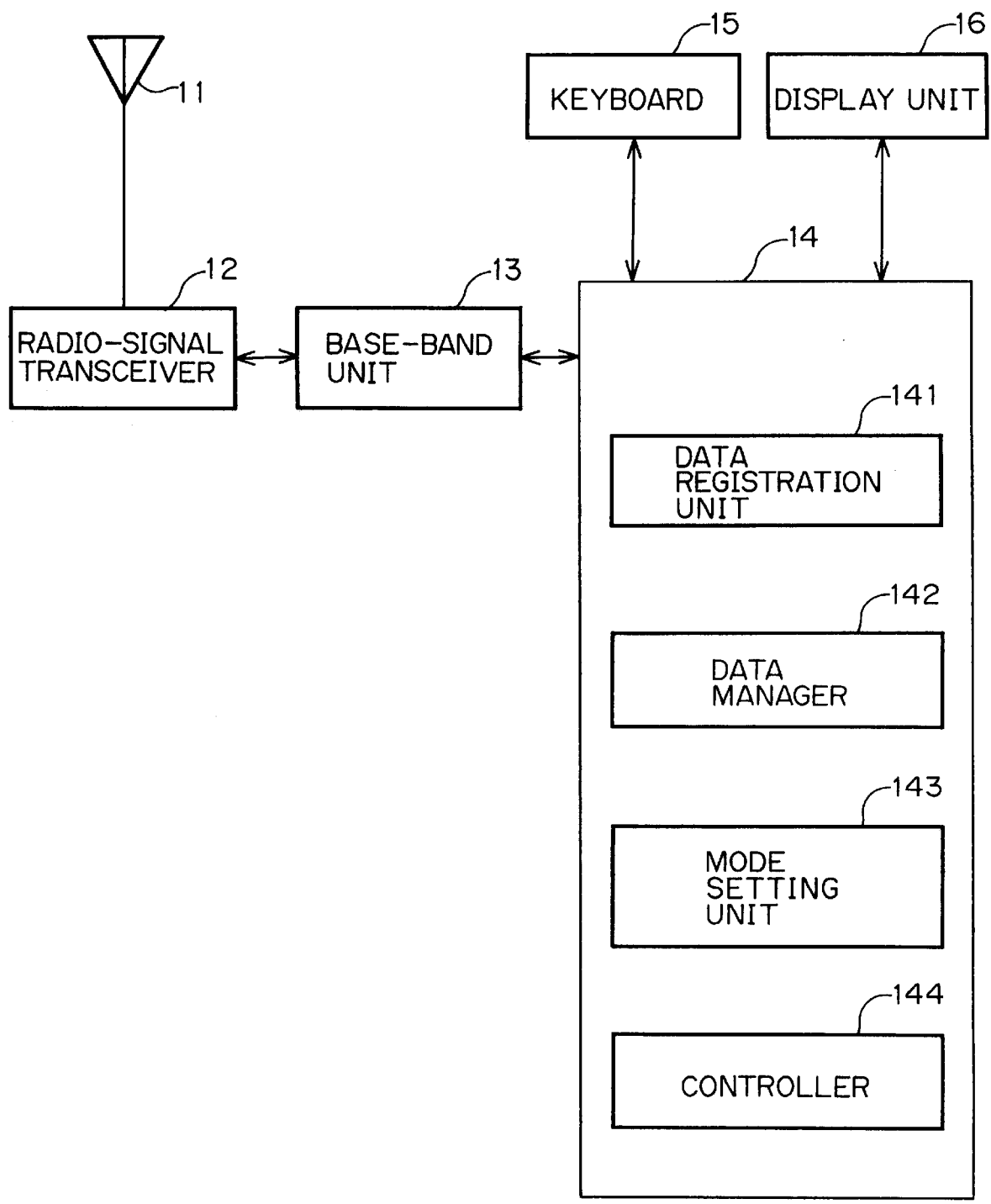
FIG. 1 is a block diagram of a handy communication terminal in accordance with a preferred embodiment of the present invention.

FIG. 1 is a block diagram of a handy communication device in accordance with the embodiment of the present invention.

The handy communication device is comprised of an antenna 11, a radio-signal transceiver 12 which transmits radio-signals to a base station through the antenna 11 and receives radio-signals from a base station through the antenna 11, a base-band unit 13 which codes radio-signals to be transmitted and decodes received signals, a central processing unit 14 which operates under a control of a program, a keyboard 15 through which a user inputs data and/or commands into the handy communication device, and a display unit 16 displaying received data or data input into the handy communication device by a user.

The central processing unit 14 is comprised of a data registration unit 141 including a memory (not illustrated) for storing data therein, a data manager 142 managing data stored in the memory 141, a mode setting unit 143 which offers a plurality of modes to a user such that the user selects one of them, and a controller 144 which controls operation of the memory 141, the data manager and the mode setting unit 143.

The data registration unit 141 receives data having been input into the handy communication device through the keyboard 15 by a user, and stores the data including telephone numbers, associated names and other items as a telephone directory, in a memory (not illustrated).

The data manager 142 manages data stored in the telephone directory included in the memory.

The mode setting unit 143 offers a plurality of modes to a user, and transmits the mode selected by a user, to the controller 144.

The controller 144 displays data stored in the telephone directory, in the display unit 16 in accordance with the mode indicated by the mode setting unit 143 and further in accordance with a predetermined order.

Figure 2:
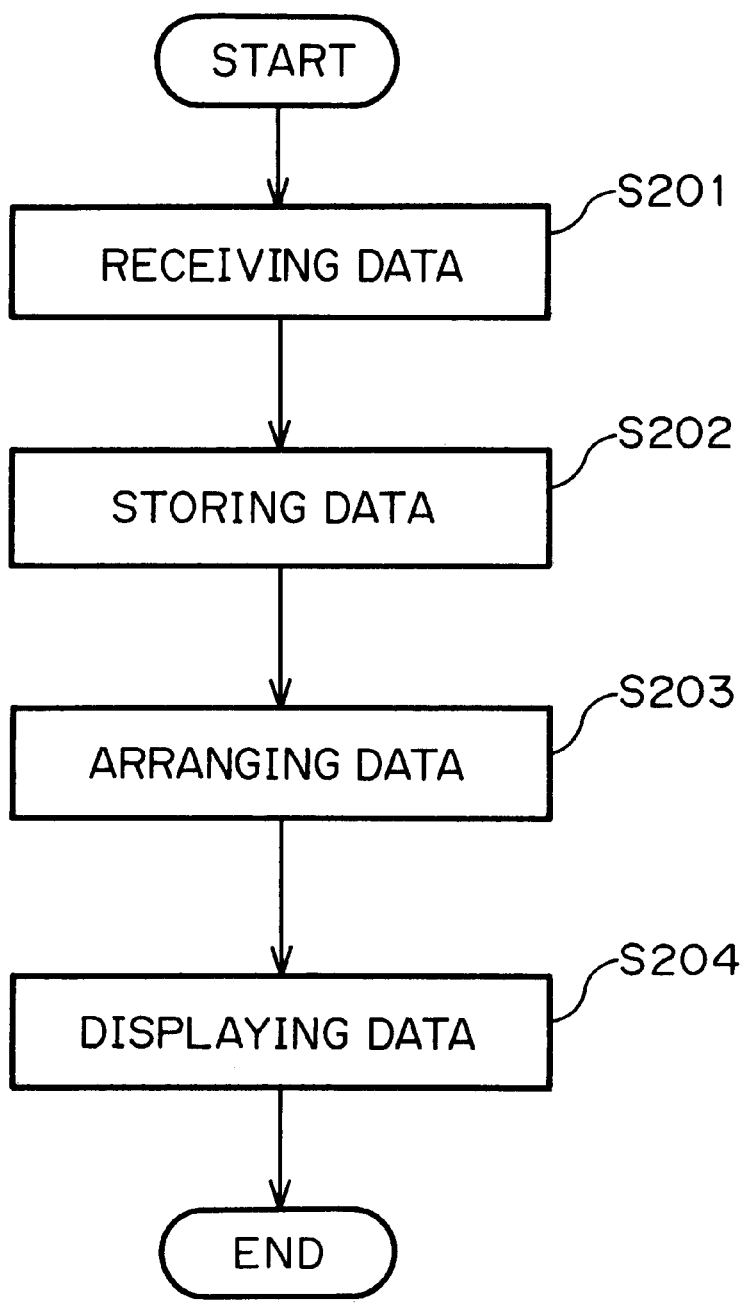
FIG. 2 is a flow chart showing steps to be carried out by the central processing unit.

FIG. 2 shows steps to be carried out by the central processing unit 14. Hereinbelow is explained an operation of the handy communication device with reference to FIG. 2.

First, the central processing unit 14 receives data to be stored therein from a user, in step S201.

After all data has been input into the central processing unit 14, and when a user selects registration of the data in the central processing unit 14, the data is stored in a telephone directory formed in the data registration unit 141, in step S202.

The data manager 142 arranges the data in accordance with a mode selected by a user and input into the central processing unit 14 through the mode setting unit 143, in step S203.

The controller 144 displays the data in the display unit 16 in accordance with the mode indicated by the mode setting unit 143, in step S204.

FIG. 3 is a flow chart showing steps to be carried out in a first mode in which an order of displaying telephone numbers is determined in accordance with a time selected by a user, and FIGS. 4A and 4B illustrate examples of images to be displayed in the display unit 16 in the first mode.

First, a user selects a mode-setting menu, in step S301.

Then, a user is asked as to whether he/she sets a mode, in step S302.

If the user selects setting the first mode (YES in step S302), the central processing unit 14 displays such an inquiry as illustrated in FIG. 4A in the display unit 16, in step S303. The inquiry reads "Do you set a mode in accordance with a time? Yes or No".

If the user selects "Yes" (Yes in step S304), the central processing unit 14 displays such a statement as illustrated in FIG. 4B, in step S305. The statement reads "Please indicate a time at which the mode starts and ends".

In response to the statement, the user inputs the time at which the mode starts and ends, in step S306.

After the time has been input into the central processing unit 14, the central processing unit 14 displays an inquiry asking the user which order of displaying telephone numbers the user selects, in step S307.

In response to the inquiry, the user selects a specific order in which telephone numbers stored in the data registration unit 141 are displayed in the display unit 16, while the first mode is on, in step S308.

When the specific order is selected by the user, the selection of the mode becomes fixed, in step S309.

Then, the mode-setting step ends, in step S310.

If the user does not select setting a mode (NO in step S302), or if the user selects "No" (NO in step S304), non-selection of a mode becomes fixed, in step S311. Then, the mode-setting step ends, in step S310.

After the mode-setting step has ended, the handy communication device returns to a stand-by mode in which the handy communication device waits receiving a call, in step S312.

At the time having been input by the user in step S306, the controller 144 re-arranges telephone numbers in accordance with the order selected by the user in step S308, in step S314, and displays the thus re-arranged telephone numbers in the display unit 16, in step S315.

As mentioned above, the telephone numbers stored in the data registration unit 141 are displayed in the display unit 16 in the specific order in accordance with the first mode selected by the user.

The first mode presents a merit to a user as follows.

For instance, it is assumed that the controller 144 always displays telephone numbers in the display unit 16 in an order of receiving calls. Herein, it is assumed that the user selects the first mode, and set the first mode to start at one o'clock p.m. and ends at three o'clock p.m. on Oct. 1, 2001 (Monday), and the user further selects an order of transmitting calls as an order of displaying telephone numbers. Herein, the time at one o'clock p.m. to three o'clock p.m. is the time during which the user could get a call through to others at once before. By setting in the above-mentioned manner, the user can make communication with others through the handy communication device without wasting time.

FIG. 5 is a flow chart showing steps to be carried out in a second mode in which an order of displaying telephone numbers is determined in accordance with an area where a user is, and FIGS. 6A to 6C illustrate examples of images to be displayed in the display unit 16 in the second mode.

First, a user selects a mode-setting menu, in step S501.

Then, a user is asked as to whether he/she sets a mode, in step S502.

If the user selects setting a mode (YES in step S502), the central processing unit 14 displays such an inquiry as illustrated in FIG. 6A in the display unit 16, in steps S503 and S504. The inquiry reads "Do you set a mode in accordance with an area where you are? Yes or No".

If the user selects "Yes" (Yes in step S504), the central processing unit 14 displays such a second inquiry as illustrated in FIG. 6B, in steps S505 and S506. The second inquiry reads "Do you finish selection of an area? Yes or No".

If the user answers "No" (No in step S506), the central processing unit 14 displays such a list as illustrated in FIG. 6C, in steps S507. Then, the user selects an area among first to third areas, and further selects "ON" or "OFF" for the selected area, in step S508.

If the user selects "ON" for a certain area (YES in step S508), the central processing unit 14 displays an inquiry asking the user which order of displaying telephone numbers the user selects, in step S509.

In response to the inquiry, the user selects a specific order in which telephone numbers stored in the data registration unit 141 are displayed in the display unit 16, while the second mode is on, in step S510.

When the specific order is selected by the user, the selection of the mode becomes fixed, in step S511.

Then, the second inquiry as illustrated in FIG. 6B is displayed again in the display unit 16.

Then, the above-mentioned steps S505 to S511 are repeated, that is, the user selects other area or areas, if necessary, and further selects "ON" or "OFF" for the selected area or areas.

After the user finishes the selection of area or areas (YES in step S506), the mode-setting step ends, in step S513.

If the user does not select setting the second mode (NO in step S502), or if the user selects "No" (NO in step S504), non-selection of a mode becomes fixed, in step S514. Then, the mode-setting step ends, in step S513.

After the mode-setting step has ended, the handy communication device returns to a stand-by mode in which the handy communication device waits receiving a call, in step S515.

When the user or the handy communication device enters the selected area, in step S516, the controller 144 re-arranges telephone numbers in accordance with the order selected by the user in step S510, in step S517, and displays the thus re-arranged telephone numbers in the display unit 16, in step S518.

As mentioned above, the telephone numbers stored in the data registration unit 141 are displayed in the display unit 16 in the specific order in accordance with the second mode selected by the user.

The second mode presents a merit to a user as follows.

If a user is scheduled to visit his/her clients in a certain area, he/she can be readily aware of telephone numbers of the clients when he/she enters the certain area, by setting the handy communication device in the above-mentioned second mode.

Figure 7:
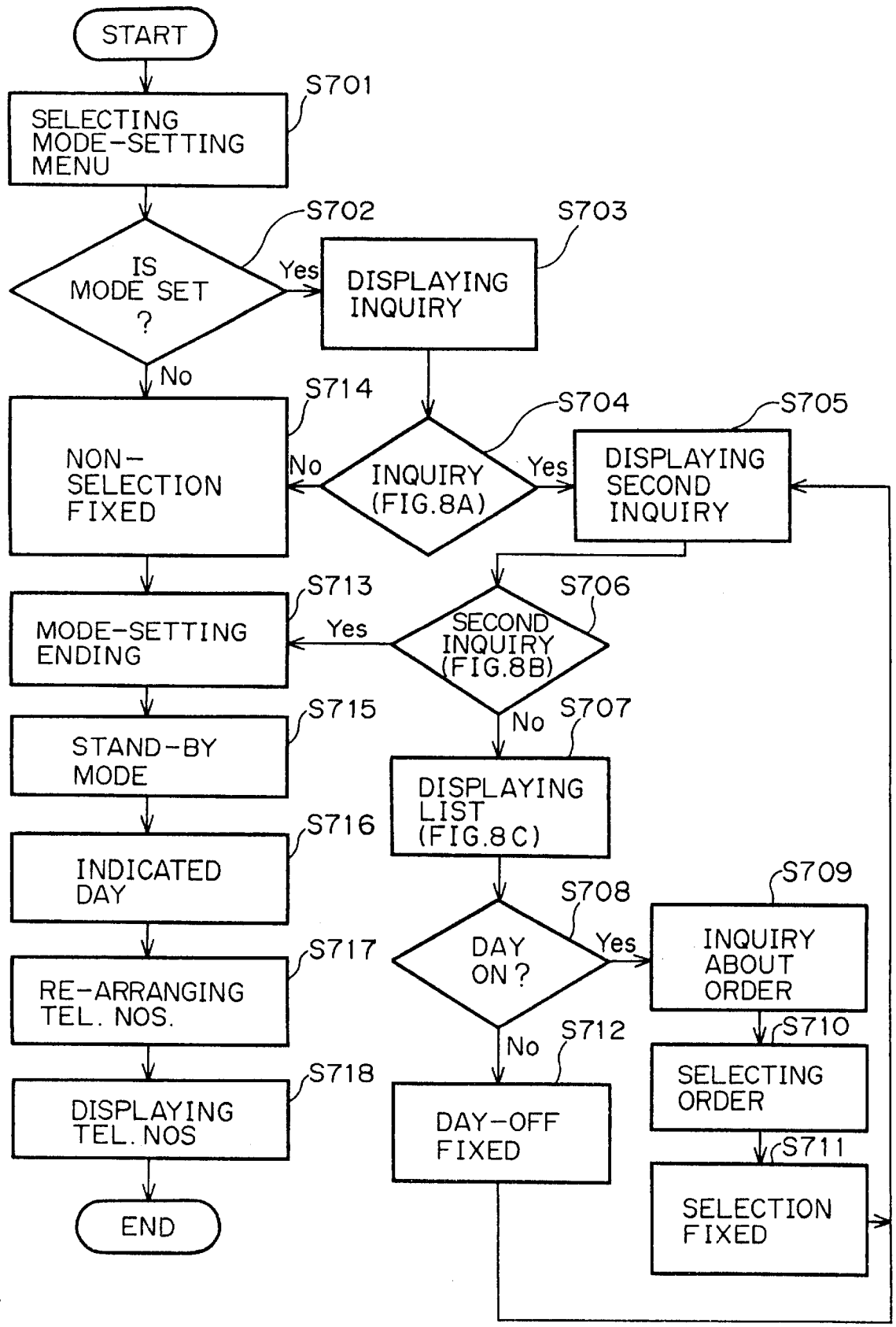
FIG. 7 is a flow chart showing steps to be carried out in the third mode in which an order of displaying telephone numbers is determined in accordance with a day of the week.

FIG. 7 is a flow chart showing steps to be carried out in a third mode in which an order of displaying telephone numbers is determined in accordance with a day of the week selected by a user, and FIGS. 8A, 8B and 8C illustrate examples of images to be displayed in the display unit 16 in the third mode.

First, a user selects a mode-setting menu, in step S701.

Then, a user is asked as to whether he/she sets a mode, in step S702.

If the user selects setting a mode (YES in step S702), the central processing unit 14 displays such an inquiry as illustrated in FIG. 8A in the display unit 16, in step S703. The inquiry reads "Do you set a mode in accordance with a day of the week? Yes or No".

If the user selects "Yes" (Yes in step S704), the central processing unit 14 displays such a second inquiry as illustrated in FIG. 8B, in steps S705 and S706. The second inquiry reads "Do you finish selection of a day of the week? Yes or No".

If the user answers "No" (No in step S706), the central processing unit 14 displays such a list as illustrated in FIG. 8C, in steps S707. Then, the user selects a day of the week among Monday to Sunday, and further selects "ON" or "OFF" for the selected day, in step S708.

If the user selects "ON" for a certain day (YES in step S708), the central processing unit 14 displays an inquiry asking the user which order of displaying telephone numbers the user selects, in step S709.

In response to the inquiry, the user selects a specific order in which telephone numbers stored in the data registration unit 141 are displayed in the display unit 16, while the third mode is on, in step S710.

When the specific order is selected by the user, the selection of the mode becomes fixed, in step S711.

Then, the second inquiry as illustrated in FIG. 8B is displayed again in the display unit 16 (step S705).

Then, the above-mentioned steps S705 to S711 are repeated, that is, the user selects other day or days, if necessary, and further selects "ON" or "OFF" for the selected day or days.

After the user finishes the selection of day or days (YES in step S706), the mode-setting step ends, in step S713.

If the user does not select setting the third mode (NO in step S702), or if the user selects "No" (NO in step S704), non-selection of a mode becomes fixed, in step S714. Then, the mode-setting step ends, in step S713.

After the mode-setting step has ended, the handy communication device returns to a stand-by mode in which the handy communication device waits receiving a call, in step S715.

In the day selected by the user (step S516), the controller 144 re-arranges telephone numbers in accordance with the order selected by the user in step S710, in step S717, and displays the thus re-arranged telephone numbers in the display unit 16, in step S718.

As mentioned above, the telephone numbers stored in the data registration unit 141 are displayed in the display unit 16 in the specific order in accordance with the third mode selected by the user.

The third mode presents a merit to a user as follows.

When the user has a task of filing a weekly report to his/her clients on a predetermined day of the week, for instance, on Friday, he/she can be readily aware of telephone numbers of the clients in an alphabetical order or in other order, by setting the handy communication device in the above-mentioned third mode.

FIG. 9 is a flow chart showing steps to be carried out in a fourth mode in which an order of displaying telephone numbers is determined in accordance with both the time, and a day of the week selected by a user, and FIGS. 10A and 10B illustrate examples of images to be displayed in the display unit 16 in the fourth mode.

First, a user selects a mode-setting menu, in step S901.

Then, a user is asked as to whether he/she sets a mode, in step S902.

If the user selects setting a mode (YES in step S902), the central processing unit 14 displays such an inquiry as illustrated in FIG. 10A in the display unit 16, in step S903. The inquiry reads "Assign priority to the following modes: Time ( ) Day ( ) OK?".

Herein, it is assumed that the user assigns top priority to "Time" and second priority to "Day", in step S904. As a result, the display unit 16 displays "Time (1) Day (2)" as illustrated in FIG. 10A.

Then, the central processing unit 14 displays such an inquiry as illustrated in FIG. 10B in the display unit 16, in step S905. The inquiry reads "Select a mode: Time, Day, Termination of Mode-setting".

In response to the inquiry, the user selects one of the modes, in step S906.

If the user selects "Time", the central processing unit 14 displays such an inquiry as illustrated in FIG. 4A, in steps S907 and S908.

If the user selects "Yes" (Yes in step S908), the central processing unit 14 displays such a statement as illustrated in FIG. 4B, in step S909.

In response to the statement, the user inputs the time at which the mode starts and ends, in step S910.

After the time has been input into the central processing unit 14, the central processing unit 14 displays an inquiry asking the user which order of displaying telephone numbers the user selects, in step S911.

In response to the inquiry, the user selects a specific order in which telephone numbers stored in the data registration unit 141 are displayed in the display unit 16, while the fourth mode is on, in step S912.

When the specific order is selected by the user, the selection of the mode becomes fixed, in step S913.

Then, the central processing unit 14 displays the inquiry as illustrated in FIG. 10B in the display unit 16 (step S905).

If the user does not select setting the mode (NO in step S908), non-selection of the mode becomes fixed, in step S914. Then, the central processing unit 14 displays the inquiry as illustrated in FIG. 10B in the display unit 16 (step S905).

Then, if the user selects "Day" following "Time", the central processing unit 14 displays such an inquiry as illustrated in FIG. 8A in the display unit 16, in step S915. The inquiry reads "Do you set a mode in accordance with a day of the week? Yes or No".

If the user selects "Yes" (Yes in step S915), the central processing unit 14 displays such a second inquiry as illustrated in FIG. 8B, in step S916. The second inquiry reads "Do you finish selection of a day of the week? Yes or No".

If the user answers "No" (No in step S916), the central processing unit 14 displays such a list as illustrated in FIG. 8C, in steps S917. Then, the user selects a day of the week among Monday to Sunday, and further selects "ON" or "OFF" for the selected day, in step S918.

If the user selects "ON" for a certain day, the central processing unit 14 displays an inquiry asking the user which order of displaying telephone numbers the user selects, in step S919.

In response to the inquiry, the user selects a specific order in which telephone numbers stored in the data registration unit 141 are displayed in the display unit 16, while the fourth mode is on, in step S920.

If the specific order has been already indicated by the user in step S912, it is no longer necessary to select a specific order in step S920.

When the specific order is selected by the user, the selection of the mode becomes fixed, in step S921.

Then, the second inquiry as illustrated in FIG. 8B is displayed again in the display unit 16 (step S905).

Then, the above-mentioned steps S905 to S921 are repeated, that is, the user selects other day or days, if necessary, and further selects "ON" or "OFF" for the selected day or days.

After the user finishes the selection of day or days (step S906), the mode-setting step ends, in step S922.

If the user does not select setting the third mode (NO in step S902), non-selection of a mode becomes fixed, in step S923. Then, the mode-setting step ends, in step S922.

After the mode-setting step has ended, the handy communication device returns to a stand-by mode in which the handy communication device waits receiving a call, in step S924.

On the selected day having been input by the user in step S918 and at the time having been input by the user in step S910, the controller 144 re-arranges telephone numbers in accordance with the order selected by the user in step S912 or S920, in step S926, and displays the thus re-arranged telephone numbers in the display unit 16, in step S927.

As mentioned above, the telephone numbers stored in the data registration unit 141 are displayed in the display unit 16 in the specific order in accordance with the fourth mode. The fourth mode is equivalent to a combination of the above-mentioned first and third modes. Hence, the fourth mode presents the above-mentioned merits presented by the first and third modes.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-313908 filed on Oct. 13, 2000 including specification, claims, drawings and summary is incorporated herein by reference in its entirety.

What is claimed is:

1. A handy communication terminal comprising:

(a) a memory which stores telephone numbers input into said handy communication terminal;

(b) a display unit which displays said telephone numbers; and (c) a controller which displays modes each of which determines a specific order of displaying said telephone numbers in said display unit, and displays said telephone numbers in said display unit in accordance with a mode selected by a user of said handy communication terminal, wherein said modes include a mode by which a specific order of displaying said telephone numbers is determined by said user in accordance with an area in which said handy communication terminal is located and is being used.

2. The handy communication terminal as set forth in claim 1, wherein said controller assigns a priority to each of said modes, and displays said telephone numbers in accordance with a mode having a higher priority than others.

3. The handy communication terminal as set forth in claim 1, wherein said modes include a mode by which a specific order of displaying said telephone numbers is determined in accordance with a time of day.

4. The handy communication terminal as set forth in claim 1, wherein said modes include a mode by which a specific order of displaying said telephone numbers is determined in accordance with a day of the week.

5. A method of displaying telephone numbers in a handy communication terminal, comprising the steps of:

(a) storing telephone numbers in said handy communication terminal;

(b) displaying, on a display of said handy communication terminal, a plurality of modes of said handy communication terminal;

(c) selecting, by a user of said handy communication terminal, one of said plurality of modes that are displayed to the user on a display of the handy communication terminal, in accordance with which an order of displaying said telephone numbers is determined, wherein, when said one of said plurality of modes corresponds to a mode by which a specific order of displaying said telephone numbers is determined in accordance with a corresponding one of a plurality of areas in which said handy communication terminal is used, said method further comprises the steps of:

(c) determining, by said user, an order of displaying each of said telephone numbers on said display, for each of said plurality of areas designated by said user; and (d) displaying said telephone numbers in said order on said display of said handy communication terminal, based on which of said plurality of areas said handy communication terminal is currently located and is currently in use.

6. A method of displaying telephone numbers in a handy communication terminal, comprising the steps of:

(a) storing telephone numbers in said handy communication terminal;

(b) selecting a mode in accordance with which an order of displaying said telephone numbers is determined;

(c) displaying said telephone numbers in said order in a display unit of said handy communication terminal; and (d) determining, by a user of said handy communication terminal, an order of displaying said telephone numbers in each of said modes.

7. The method as set forth in claim 6, wherein said step (b) includes the steps of:

(b1) displaying a mode-selection inquiry for asking a user which mode said user selects;

(b2) assigning a priority to each of modes; and (b3) selecting, by said user, an order of displaying said telephone numbers while each of said modes is in operation.

8. The method as set forth in claim 6, further comprising the step of assigning, by said user, a priority to each of said modes such that said telephone numbers is displayed in accordance with a mode having a higher priority than others.

9. The method as set forth in claim 6, wherein said step (b) includes the steps of:

(b1) displaying a mode-selection inquiry for asking a user which mode said user selects;

(b2) inputting a time at which a first mode starts and ends, if said user selects said first mode in said step (b1); and (b3) selecting, by said user, an order of displaying said telephone numbers while said first mode is in operation.

10. The method as set forth in claim 6, wherein said step (b) includes the steps of:

(b1) displaying a mode-selection inquiry for asking a user which mode said user selects;

(b2) selecting, by said user, an area in which said telephone numbers is arranged in accordance with a specific order, if said user selects a second mode in said step (b1); and (b3) selecting an order of displaying said telephone numbers while said second mode is in operation.

11. The method as set forth in claim 6, wherein said step (b) includes the steps of:

(b1) displaying a mode-selection inquiry for asking a user which mode said user selects;

(b2) selecting a day of the week in which said telephone numbers is arranged in accordance with a specific order, if said user selects a third mode in said step (b1); and (b3) selecting, by said user, an order of displaying said telephone numbers while said third mode is in operation.

* * * * *